(12) United States Patent
Segalini et al.

(10) Patent No.: US 11,500,868 B2
(45) Date of Patent: Nov. 15, 2022

(54) EFFICIENT IDENTIFICATION OF VERTICES AND EDGES FOR GRAPH INDEXES IN AN RDBMS

(71) Applicant: Oracle International Corporation, Redwood Shores, CA (US)

(72) Inventors: Andrea Segalini, Nice (FR); Jean-Pierre Lozi, Zurich (CH); Laurent Daynes, Saint-Ismier (FR); Marco Arnaboldi, Zurich (CH); Vlad Ioan Haprian, Zurich (CH); Hugo Kapp, Zurich (CH); Shasank Kisan Chavan, Menlo Park, CA (US); Zhen Hua Liu, San Mateo, CA (US); Danica Porobic, Zurich (CH)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/162,527

(22) Filed: Jan. 29, 2021

(65) Prior Publication Data

US 2022/0245147 A1 Aug. 4, 2022

(51) Int. Cl.
| G06F 16/245 | (2019.01) |
| G06F 16/22 | (2019.01) |
| G06F 16/2453 | (2019.01) |
| G06F 16/2452 | (2019.01) |
| G06F 16/2455 | (2019.01) |

(52) U.S. Cl.
CPC .... *G06F 16/24542* (2019.01); *G06F 16/2228* (2019.01); *G06F 16/2456* (2019.01); *G06F 16/24526* (2019.01); *G06F 16/24552* (2019.01)

(58) Field of Classification Search
None
See application file for complete search history.

(56) References Cited

U.S. PATENT DOCUMENTS

| 6,006,233 | A | 12/1999 | Schultz |
| 7,580,947 | B2 | 8/2009 | Kasravi |
| 8,996,492 | B2 | 3/2015 | Paradies et al. |
| 9,317,529 | B2 | 4/2016 | Bamba et al. |
| 9,519,680 | B2 | 12/2016 | Hu et al. |
| 10,019,536 | B2 | 7/2018 | Hong et al. |
| 10,204,135 | B2 | 2/2019 | Mishra et al. |
| 10,268,610 | B1 | 4/2019 | McKenney |
| 10,346,138 | B1 | 7/2019 | Quillen |
| 10,452,655 | B2 | 10/2019 | Lahorani et al. |
| 2002/0178341 | A1* | 11/2002 | Frank ............... G06F 16/245 |

(Continued)

OTHER PUBLICATIONS

Oracle Database Concepts, "Data Concurrency and Consistency", Chapter 13, 10g Release (10.1), Part No. B10743-01, dated Dec. 2003, 39 pages.

(Continued)

*Primary Examiner* — Son T Hoang
(74) *Attorney, Agent, or Firm* — Hickman Becker Bingham Ledesma LLP

(57) ABSTRACT

Vertex/edge table rows are mapped to unique integer identifiers, to enable construction of in-memory representation of a graph from existing, unmodified RDBMS tables. The unique integer identifiers are based on an encoding of primary key values of the table rows. The unique integer identifiers are used as graph indexes of the in-memory representation.

22 Claims, 12 Drawing Sheets

(56) References Cited

U.S. PATENT DOCUMENTS

| | | | |
|---|---|---|---|
| 2004/0133747 | A1 | 7/2004 | Coldewey |
| 2006/0101001 | A1 | 5/2006 | Lindsay et al. |
| 2008/0184197 | A1 | 7/2008 | Dobbins et al. |
| 2008/0281801 | A1* | 11/2008 | Larson .................. G06F 16/284 |
| 2009/0006450 | A1 | 1/2009 | Champion |
| 2010/0088666 | A1 | 4/2010 | Box et al. |
| 2011/0267351 | A1 | 11/2011 | Curbera |
| 2011/0270861 | A1 | 11/2011 | Arshavsky et al. |
| 2015/0143179 | A1 | 5/2015 | Desai |
| 2015/0169757 | A1 | 6/2015 | Kalantzis |
| 2016/0063132 | A1 | 3/2016 | Chen et al. |
| 2016/0071233 | A1* | 3/2016 | Macko ................ G06F 16/9024 |
| 2016/0103931 | A1 | 4/2016 | Appavu |
| 2016/0117358 | A1 | 4/2016 | Schmid et al. |
| 2016/0179883 | A1 | 6/2016 | Chen |
| 2017/0031976 | A1 | 2/2017 | Chavan et al. |
| 2017/0046388 | A1 | 2/2017 | Kirk et al. |
| 2017/0060973 | A1 | 3/2017 | Liu et al. |
| 2017/0091246 | A1 | 3/2017 | Risvik |
| 2017/0147705 | A1* | 5/2017 | Kasperovics ....... G06F 16/2433 |
| 2018/0067987 | A1 | 3/2018 | Kang et al. |
| 2018/0096000 | A1* | 4/2018 | Harrison ............... G06F 16/211 |
| 2018/0218088 | A1 | 8/2018 | Fischer et al. |
| 2018/0293329 | A1 | 10/2018 | Yanagisawa |
| 2018/0329958 | A1 | 11/2018 | Choudhury |
| 2019/0121810 | A1 | 4/2019 | Zhuang |
| 2019/0179752 | A1 | 6/2019 | Yoo et al. |
| 2019/0205480 | A1 | 7/2019 | Zhang et al. |
| 2019/0213356 | A1 | 7/2019 | Vagujhelyi et al. |
| 2019/0303506 | A1* | 10/2019 | Brass .................... G06F 16/248 |
| 2020/0265049 | A1 | 8/2020 | da Trindade et al. |
| 2021/0034615 | A1 | 2/2021 | Chen et al. |
| 2021/0081428 | A1 | 3/2021 | Ravada |
| 2021/0224235 | A1* | 7/2021 | Arnaboldi ........... G06F 16/9024 |
| 2022/0114178 | A1 | 4/2022 | Haprian et al. |
| 2022/0129451 | A1 | 4/2022 | Haprian et al. |
| 2022/0129461 | A1* | 4/2022 | Haprian ............ G06F 16/24558 |
| 2022/0129465 | A1 | 4/2022 | Haprian et al. |

OTHER PUBLICATIONS

Apache TinkerPop, "The Gremlin Graph Traversal Machine and Language", tinkerpop.apache.org/gremlin.html, last viewed on Nov. 4, 2020, 6 pages.

Artemiou, "Introducing SQL Server In-Memory OLTP", https://www.red-gate.com/simple-talk/sql/learn-sql-server/introducing-sql-server-in-memory-oltp/, dated Sep. 30, 2015, 10 pages.

Chapter 7. Performance Tips, https://postgis.net/docs/performance_tips.html, dated Mar. 30, 2020, 7 pages.

Databricks, "Graph Analysis Tutorial with GraphFrames", dated Jul. 21, 2020, https://docs.databricks.com/spark/latest/graph-analysis/graphframes/graph-analysis-tutorial.html, 2 pages.

Heer et al., "Software Design Patterns for Information Visualization", IEEE Transactions on Visualization and Computer Graphics, vol. 12, dated Sep. 2006, 8 pages.

Kelly, Wikibon, "Primer on SAP HANA", wikibon.org/wiki/v/Primer_on_SAP_HANA, dated Jul. 12, 2013, 6 pages.

Michaels, Jan, "Property Graph Data Model—The Proposal", Individual Expert Contribution, dated Jan. 16, 2019, 76 pages.

Murray et al., "Spatial and Graph Developer's Guide", 20c, F15831-03, dated Apr. 2020, 164 pages.

Amazon Neptune, "Overview" https://aws.amazon.com/neptune/, last viewed on Nov. 4, 2020, 20 pages.

Neo4j Graph Platform, "What is Neo4j?", https://neo4j.com/, last viewed on Nov. 4, 2020, 14 pages.

Zemke, Fred, "Fixed Graph Patterns", ISO/IEC SC32/WG3:ERF-035, dated Sep. 14, 2018, 25 pages.

Oracle Online Documentation Library, "1.8 Spatial Relationships and Filtering", 12c Release 1 (12.1.0.2), https://docs.oracle.com/database/121/SPAT/spatial-relationships-and-filtering.htm, 4 pages.

Oracle Spatial User's Guide and References, "Spatial Data Types and Metadata", Release 9.2, Part No. A96630-01, https://docs.oracle.com/cd/B10501_01/appdev.920/a96630/sdo_objrelschema.htm, 26 pages.

Padmanabhan: "HDB-Subdue, a Relational Database Approach to Graph Mining and Hierarchical Reduction", Dec. 2005.

PGQL, "Property Graph Query Language", http://pgql-lang.org/, last viewed on Nov. 3, 2020, 5 pages.

Rudnytskiy, "Understand Spatial Columns in SAP HANA Spatial", https://developers.sap.com/tutorials/hana-spatial-intro4-columns.html, dated Dec. 11, 2016, 14 pages.

SAP HANA, "Graph Workspaces," https://help.sap.com/viewer/f381aa9c4b99457fb3c6b53a2fd29c02/2.0.03/en-US, 1pg.

Segalini et al., "Patent: efficient identification of vertices and edges for graph indexes in an RDBMS", dated Nov. 2015, 12 pages.

SQL Server, "Optimizing SQL Server Spatial Queries with Bounding Box", https://aboutsqlserver.com/2013/09/03/optimizing-sql-server-spatial-queries-with-bounding-box/, dated Sep. 3, 2013, 14 pages.

TigerGraph, "The Only Scalable Graph Database for the Enterprise", https://www.tigergraph.com/, last viewed on Nov. 4, 2020, 9 pages.

Neo4j Graph Database Platform, "Cypher Query Language", https://neo4j.com/developer/cypher/, dated Nov. 4, 2020, 7 pages.

Sap Hana, "Create an SAP HANA Graph Workspace", Tutorials for SAP Developers, https://developers.sap.com/tutorials/hana-graph-overview-setup.html, dated Dec. 19, 2018, 17 pages.

PostGIS 2.3.10 Manual, "Performance Tips", Chaper 7, dated Aug. 11, 2018, 5 pages.

Paul M. Aoki, "How to Avoid Building DataBlades That Know the Value of Everything and the Cost of Nothing", Computer Science Divison, EECS Department, University of California, Berkeley, Year 1999, 12 pages.

Wikipedia, the free encyclopedia, "Subgraph isomorphism problem", https://en.wikipedia.org/wiki/Subgraph_isomorphism_problem, last viewed on Jan. 29, 2021, 4 pages.

Wikipedia, the free encyclopedia, "PageRank", https://en.wikipedia.org/wiki/PageRank, last viewed on Jan. 29, 2021, 16 pages.

Wikipedia, the free encyclopedia, "Isolation (database systems)", https://en.wikipedia.org/wiki/Isolation_(database_systems), last viewed on Jan. 29, 2021, 8 pages.

Wikipedia, the free encyclopedia, "Fetch-and-add", https://en.wikipedia.org/wiki/Fetch-and-add, last viewed on Jan. 29, 2021, 4 pages.

Wikipedia, the free encyclopedia, "Bellman-Ford algorithm", https://en.wikipedia.org/wiki/Bellman%E2%80%93Ford_algorithm, last viewed on Jan. 29, 2021, 6 pages.

SAP.dom, "SAP HANA Graph Reference", SAP HANA Platform 2.0 SPS 03 Document Version: 1.1 dated Oct. 31, 2018, 84 pages.

SAP.com, "SAP HANA", Harness the power of an in-memory database with SAP HANA, SAP Business Technology Platform, https://www.sap.com/products/hana.html, last viewed on Jan. 29, 2021, 19 pages.

Microsoft.com, "SQL Sever 2019" https://www.microsoft.com/en-us/sql-server/sql-server-2019, last viewed on Jan. 29, 2021, 8 pages.

Microsoft Docs, "Graph processing with SQL Server and Azure SQL Database",docs.microsoft.com/en-us/sql/relational databases/graphs/sql-graph-overview?view=sql-server-ver15, dated Jun. 26, 2019, 5 pgs.

Hong et al., "PGX.D: A Fast Distributed Graph Processing Engine", SC '15, dated Nov. 15-20, 2015, Austin, TX, USA, 12 pages.

Hassan et al., "Extending In-Memory Relational Database Engines with Native Graph Support", Proceedings of the 21st International Conference on Extending Database Technology, dated Mar. 2018, 12 pgs.

Graph Query Language GQL, "GQL Standard", https://www.gqlstandards.org/home, last viewed on Jan. 29, 2021, 2 pages.

Wheatman et al., "Packed Compressed Sparse Row: A Dynamic Graph Representation", dated 2018,7 pages.

Valiyev, Mahammad, "Graph Storage: How good is CSR really?", dated Dec. 10, 2017, 8 pages.

Oracle Help Center, "ROWID Pseudocolum", dated Nov. 20, 2019, 2 pages.

(56) References Cited

OTHER PUBLICATIONS

Oracle Help Center, "Pseudoclumns", dated Nov. 20, 2019, 1 page.
IBM Knowledge Center, "Expand Your IBM Z Capabilities", dated Nov. 20, 2019, 3 pages.
Tian et al., "IBM Db2 Graph: Supporting Synergistic and Retrofittable Graph Queries Inside IBM Db2", SIGMOD '20: Proceedings of the 2020 ACM SIGMOD International Conference on Management of Data, Jun. 2020, 15 pages.
SAP.com "Get Started with SAP HANA Graph", available: https://developers.sap.com/group.hana-aa-graph-overview.html, 4 pages.
Deutsch et al., "TigerGraph: A Native MPP Graph Database", Jan. 24, 2019, 28 pages.
Annamalai et al., "PGQL Introduction and Deep Dive", Product Management, Oracle, Jul. 30, 2020, 45 pages.
Adam et al. "A Comparison of List Schedules for Parallel Processing Systems", Communications of the ACM 17(12):685-690, Dec. 1974, pp. 685-690.
Yousfi, U.S. Appl. No. 16/431,294, filed Jun. 4, 2019, Office Action, dated Apr. 6, 2020.
Yousfi, U.S. Appl. No. 16/431,294, filed Jun. 4, 2019, Notice of Allowance, dated Jan. 8, 2021.
Yousfi, U.S. Appl. No. 16/431,294, filed Jun. 4, 2019, Final Office Action, dated Jul. 8, 2020.
Yousfi, U.S. Appl. No. 16/431,294, filed Jun. 4, 2019, Advisory Action, dated Sep. 24, 2020.
Arnaboldi, U.S. Appl. No. 16/747,827, filed Jan. 21, 2020, Office Action, dated Apr. 21, 2021.
Arnaboldi, U.S. Appl. No. 16/747,827, filed Jan. 21, 2020, Notice of Allowance, dated Jun. 9, 2021.
Ravada, U.S. Appl. No. 16/904,392, filed Jun. 17, 2020, Non-Final Rejection, dated Mar. 16, 2022.
Murray, "Oracle Spatial User's Guide and Reference, Release 9.2", Part No. A96630-01, Mar. 2002, 486 pages.
Nagel et al., "Recycling in Pipelines Query Evaluation", 29th International Conference on Data Engineering (ICDE), 2013, 13 pages.

\* cited by examiner

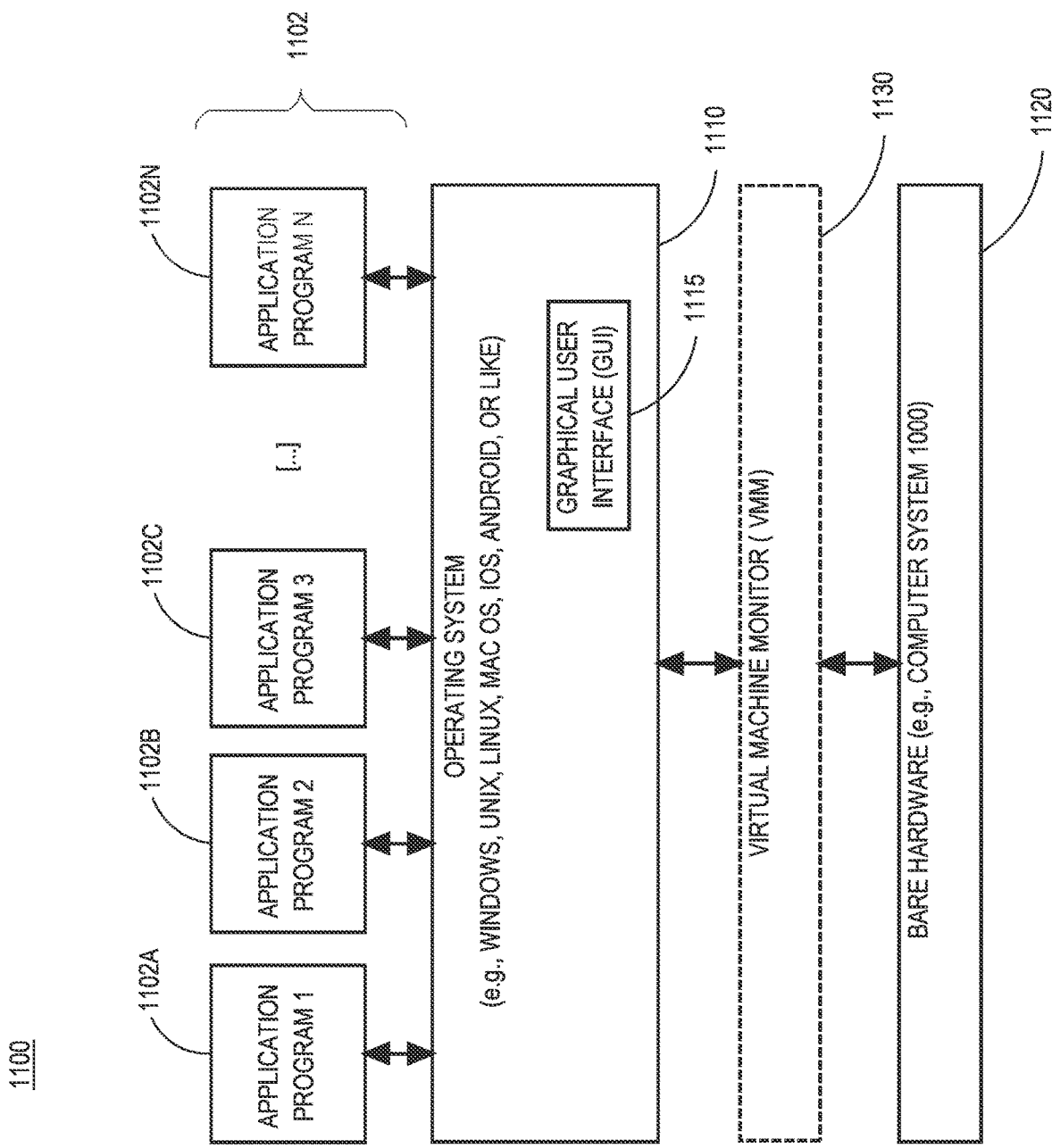

EFFICIENT IDENTIFICATION OF VERTICES AND EDGES FOR GRAPH INDEXES IN AN RDBMS

FIELD OF THE INVENTION

The present invention relates to providing vertex and edge identifiers for graph indexes in a relational database management system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Relational database management systems (RDBMSs) aim to efficiently process relational data. Data is stored as tables that are connected together through Primary Key-Foreign Key (PK-FK) relationships. Relational data can been seen as a collection of heterogeneous graphs. Rows of different tables represent different types of graph vertices. N:M relationships, and the intermediate table rows, represent graph edges connecting two sets of vertices, as shown in FIG. 1. Materializing the heterogeneous graph representation of the relational data in memory as a graph index makes it possible to speed up the execution of graph pattern matching queries and graph algorithms.

Most graph indexes use vertex identifiers to index arrays. This is the case of adjacency lists or adjacency matrices. Being able to directly index arrays with vertex identifiers to find their neighbors or edges, or to check the existence of a neighbor or edge, is key to the performance of graph indexes. Vertex identifiers also make it possible to retrieve vertex properties from the underlying tables. Similarly, edge identifiers make it possible to retrieve edge properties from the underlying tables.

Some industry solutions do not provide support for graphs and, therefore, do not need support for identifiers (IDs). Others, such as Microsoft SQL Server and SAP HANA, enable the creation and manipulation of graphs starting from a tabular representation, with vertex and edge tables, and therefore need to support graph IDs. However, this support is either partial or adds constraints to the user.

For example, Microsoft SQL Server adds a column $node_id, or $edge_id, to every vertex, and edge table. The addition of the column is not performed over existing tables, instead, tables are created from scratch specifying a graph table attribute (e.g., CREATE TABLE . . . AS NODE/AS EDGE).

For another example, SAP HANA supports the creation of graph workspaces from existing tables. It requires the user to indicate which columns to use as vertex/edge keys among the unique columns. Vertex/edge IDs can be TINY INT, SMALL INT, INTEGER, BIG INT, VARCHAR, and NVARCHAR. However, compound keys are not supported, limiting the reusability of existing tables to create graphs. Furthermore, integer data types are officially recommended.

Discussed herein are approaches for mapping table rows to integer identifiers, enabling construction of graph indexes from unmodified RDBMS tables.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 11 illustrates a block diagram of a basic software system for controlling the operation of a computing device.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In graph indexes, vertices and edges are identified by a mostly-dense range of integers, that are used to index (possibly multi-dimensional) arrays. Techniques described herein encode primary key values of vertex/edge table rows to map the rows to such integer identifiers, which enables construction of graph indexes from existing, unmodified RDBMS tables and accelerates the execution of graph queries and graph algorithms. For purposes of discussion, the Compressed Sparse Row extended with Edge identifiers (CSRE) data structure is used as a use case.

CSRE Overview

A single CSRE often represents a subgraph, part of a bigger heterogenous graph, where vertices of the same type are connected, via edges, to other vertices of a (potentially) different type. Given three RDBMS tables (e.g., a source vertex table, a destination vertex table, and an edge table) and two PK-FK relationships between such tables, a CSRE efficiently encodes how source vertices (rows of the source vertex table) are connected to destination vertices (rows of the destination vertex table), via edges (rows of the edge table). A CSRE can be seen as a compact representation of an adjacency list. Such a representation enables efficient exploration of the graph topology (e.g., following edges) by following pointers in memory instead of executing a succession of JOINs between tables.

Figure 1:
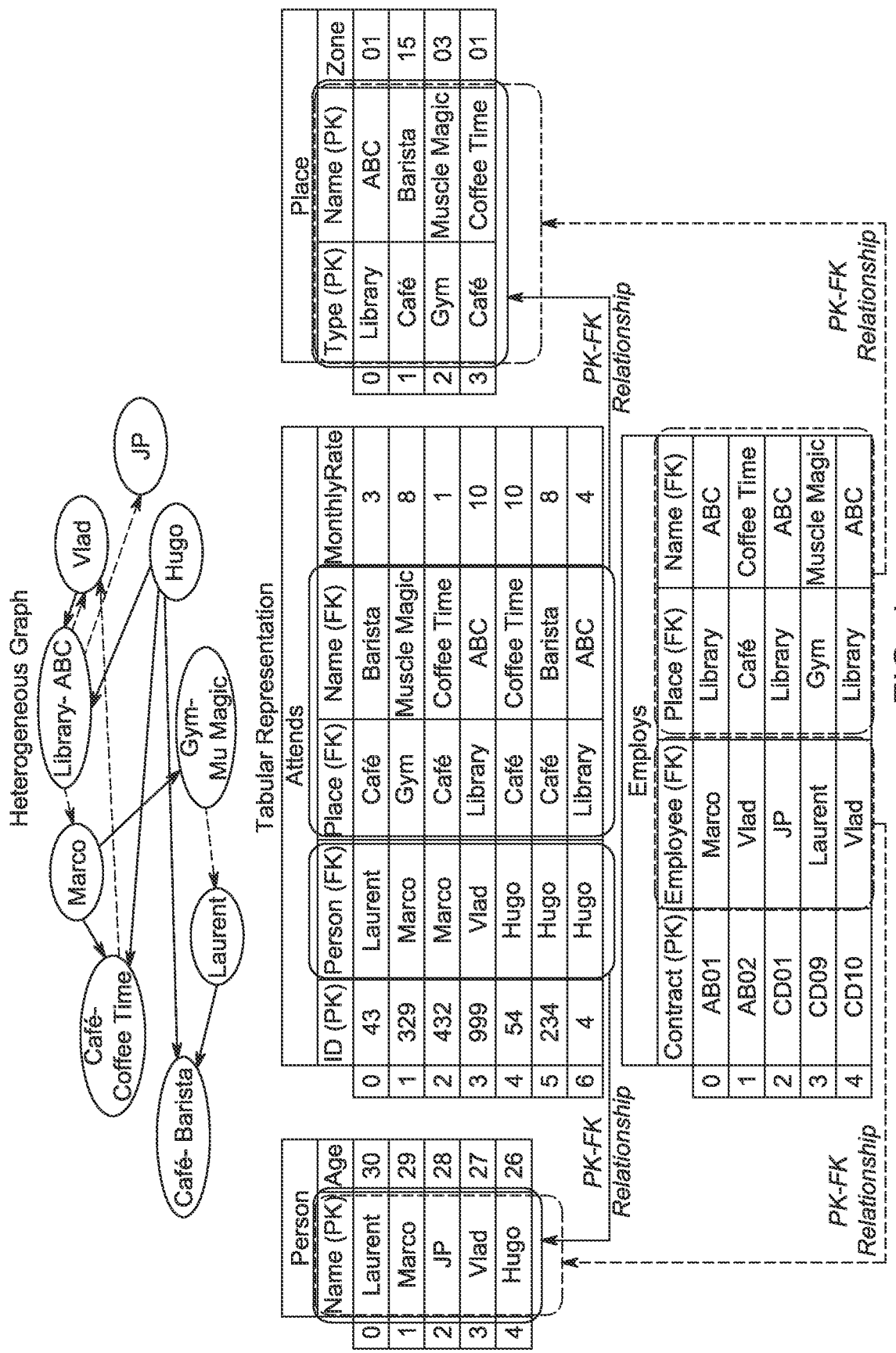
FIG. 1 illustrates an example heterogeneous graph modelled by corresponding RDBMS tables.
Figure 2:
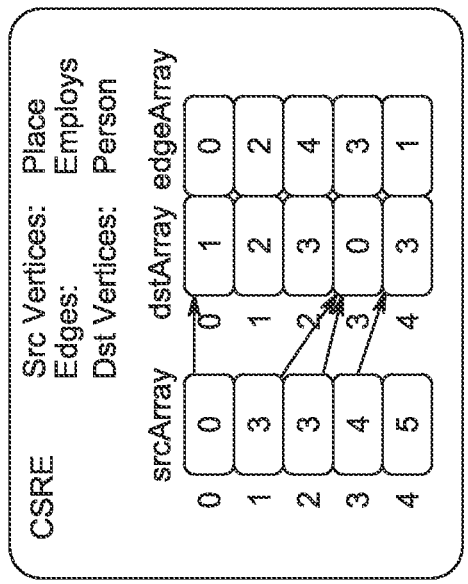
FIG. 2 illustrates CSRE structures representing the heterogeneous graph of FIG. 1.
Figure 2:
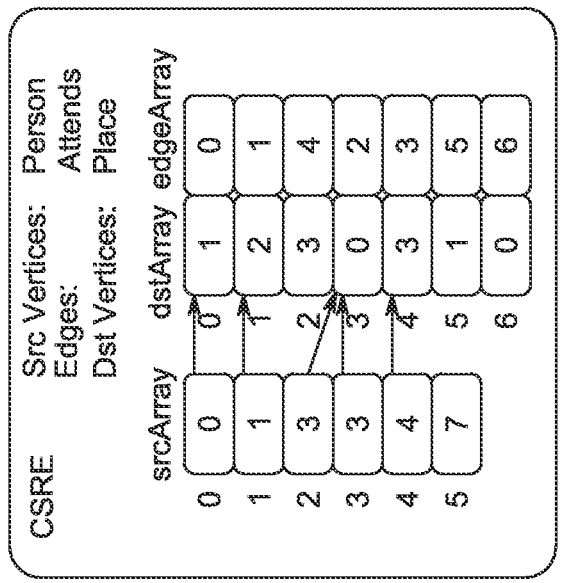

FIG. 2 illustrates two CSRE structures representing the heterogeneous graph of FIG. 1. A single CSRE is composed of three arrays: a source array (srcArray), a destination array (dstArray), and an edge array (edgeArray). The dstArray contains the identifiers of destination vertices. Neighbors of the same source vertex are stored in contiguous entries of dstArray. The srcArray has an entry for each source vertex. Given an index representing a source vertex, srcArray [i] is the offset of where the neighbors for i start within the dstArray. At index i+1, the srcArray contains the offset where the neighbors stop (e.g., let A be the content of srcArray [i] and B the content of srcArray [i+1], the neighbors for vertex i are stored contiguously from dstArray [A] until dstArray [B]−1). srcArray [i+1] represents the beginning of the neighbors for source vertex i+1. The srcArray contains an additional entry (if |V| is the number of source vertices, srcArray has |V|+1 entries) to store the number of destinations/edges. Similarly to the dstArray, the edgeArray stores the identifiers for the edges connecting a source vertex to its neighbors.

Vertex identifiers (e.g., the elements stored in dstArray), have two uses. First, a vertex identifier i makes it possible to hop to the neighbor of a vertex, by jumping to srcArray [i]. Second, a vertex identifier makes it possible to retrieve the vertex properties of a vertex, as a given vertex identifier is mapped to a unique row in a vertex table. On the other hand, edge identifiers (e.g., the elements stored in edgeArray) are not used for topology traversal (e.g., to hop to neighbors). Instead, they are only used to retrieve edge properties.

Vertex and Edge Identifiers

A CSRE representation is built from RDBMS tables, using a heterogenous graph definition DDL statement that lists information, such as the tables involved in the graph, the PK-FK relationships that connect them, or the columns that are exposed as properties. CSREs are built in main memory and associated to the graph. Within the database, vertices and edges are unequivocally identified by their PK values. However, in the CSREs, vertices and edges are identified by integer values, used as indexes for the srcArrays. These integer identifiers used in CSREs are referred to herein as in-memory graph identifiers (IMGIDs).

In-Memory Graph Identifiers

Row identifiers, suitable to be used as IMGIDs, do not exist in common RDBMSes. Before justifying this statement, the notion of a mostly dense set of identifiers is first introduced:

Given a set of sorted integers, the total sum of the gaps between two adjacent integers is bounded by a predetermined value.

In other words, the gaps between the integers cannot be arbitrary large:

Integer set 1: [0, 1, 2, 5, 10]
Integer set 2: [0, 10, 20, 30, 40]
Cumulative size sum of gaps for integer set 1: 6
Cumulative size sum of gaps for integer set 2: 36

A set of integers representing such a property is suitable to serve as index for an array structure. Assuming X is the greatest integer in the set, arrays of size X indexed by such integers are allocated. The mostly dense property limits the memory footprint of such an array. It is noted that "dense" rather than "mostly dense" is used herein for simplicity.

A class of row identifiers that are strictly required to define graphs over RDBMS tables are primary keys. Primary keys are often unsuitable to serve as IMGIDs:

A primary key can be of composed of multiple columns of arbitrary types, often non-numerical.

Even single-column primary keys of integer type are not required to use dense values, and therefore cannot be used as indexes for arrays.

RDBMSes have row identifiers for internal usage. Some expose them to users as a pseudo-column (e.g., ROWID in Oracle Database). In this case, such row identifiers encode the physical address of the row in secondary storage. Such physical identifiers are not suitable IMGIDs:

ROWIDs are specific to a given storage type, such as disk storage. Different supports have a different set of identifiers.

Being addresses, ROWIDS can be seen as a concatenation of several small integers, representing, for example, table addresses, segment addresses, block addresses, or slot numbers within a block (if blocks are slotted). Hence, ROWIDs are a very sparse set of integers. Furthermore, the size of ROWIDs can be very large (e.g., up to 13 bytes in Oracle Database).

ROWIDs identify rows in storage and disregard their contents. Instead, IMGIDs should represent the graph elements of vertex and edge tables as identified by their primary key. As an example, if the contents of two rows are swapped, the ROWIDs of the two rows remain the same, despite the fact that the graph element that they represent is now different. In this scenario, IMGIDs should also be swapped.

An existing solution is for a user to create tables with a special column holding unique and dense integer values to serve as IMGIDs. In the example illustrated in FIG. 1, a column is added. This approach is adopted by Microsoft SQL Server, which adds columns called $ node_id/$vertex_id to store integer identifiers when the user creates a table with a special property (e.g., CREATE TABLE . . . AS NODE/EDGE). Since the user needs to specify a special property at creation time for a table to be usable in a graph, this approach constrains the data model. This approach makes it impossible to reuse existing tables as they are.

In contrast, another solution is for an RDBMS to transparently assign IMGIDs to vertices and edges. Assigning IMGIDs to vertices and edges means providing and maintaining a mapping between them. Such a mapping can be created when needed, such as when a graph's CSRE representation is materialized in-memory. Hence, the cost of the mapping (its memory footprint in particular) is only paid when actively needed and can be promptly dropped in order to free resources. A significant challenge for the vertex/edge-IMGID mapping is to dynamically account for table updates, while offering consistent views to individual transactions at different versions. This property is referred to herein as transactional consistency for IMGIDs. Transactional consistency is a property that a piece of data (e.g., table rows, or IMGIDs) has when is queried within a given transaction. Given a query Q within a transaction T:

The query sees the committed data as at the moment T started.

The query sees any update (non-committed) on the data that happened within the transaction T, prior the execution of Q. Depending on the isolation level set, Q sees committed/non-committed updates from other transactions that happened prior the execution of Q.

An RDBMS, supporting a CSRE-based graph representation that is built over unmodified tables, provides, and maintains a transient and transactionally consistent mapping from vertex/edge rows to IMGIDs.

IMGID Mapping Usage in CSRE-Based Graph Analytics

To understand the importance of mapping vertices/edge to IMGIDs, the following discussion describes how components of a CSRE-powered graph analytics engine interact with such a mapping.

IMGIDs in CSRE construction. Building a CSRE requires populating the srcArray, dstArray and the edgeArray. The srcArray contains the offsets, within the dst/edgeArray, where the neighbors of each source vertex start. To fill such an array, the neighbors for a given source vertex are retrieved and, also, the source vertex IMGID (e.g., X) is needed to identify the entry of srcArray to write (srcArray [X]). The dstArray and the edgeArray contain, respectively, the identifiers of the destination vertices and the identifiers of the edges that link source and destination. The destination vertex IMGIDs and the edge IMGIDs are, respectively, the content of the dstArray and edgeArray.

Figure 3A:
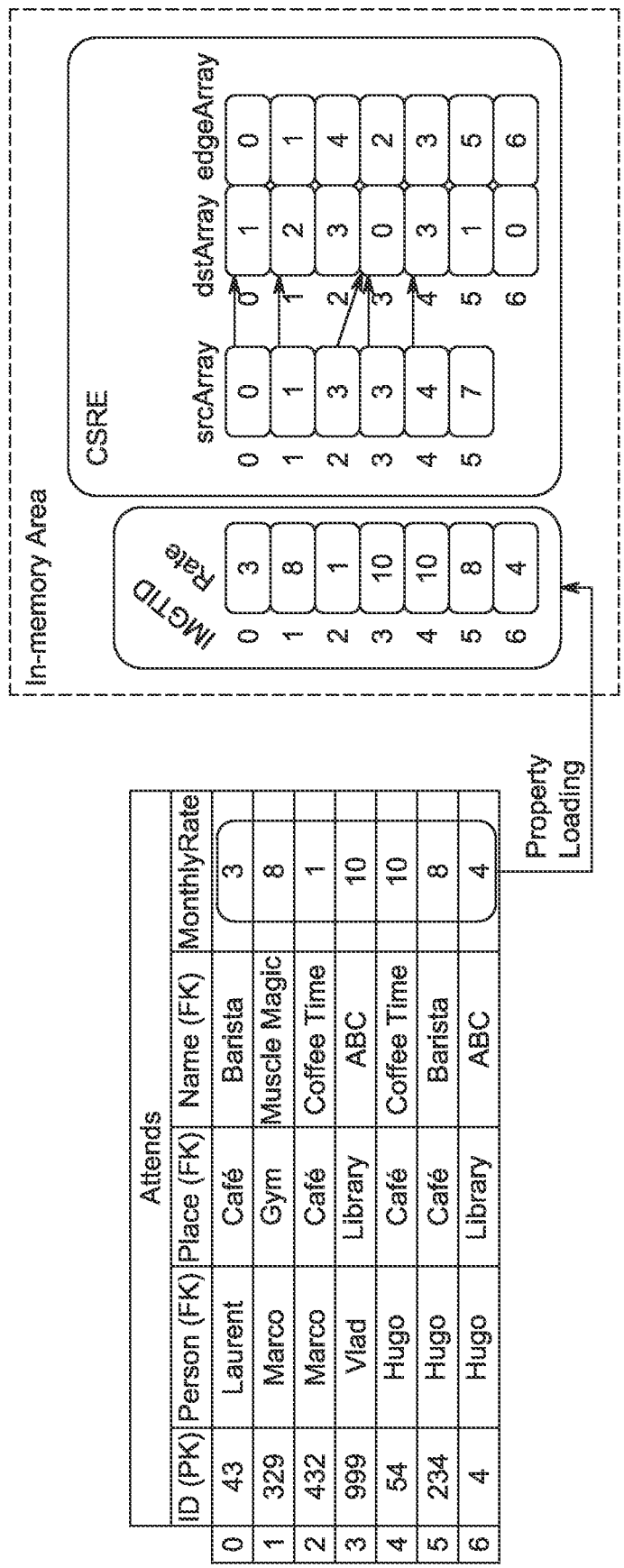
FIGS. 3A-3B illustrate IMGID mapping examples in CSRE-based graph analytics.

IMGIDs in graph algorithms. Graph Algorithms are executed against the graph topology. Graph algorithms take vertex and edge properties as their input and return vertex and edge properties as their output (input and output properties). During the execution of an algorithm, the CSRE is accessed to explore vertices and their neighbors. At the same time, property arrays are accessed to read/write vertex/edge properties needed in the computations. At this stage, vertices and edge are only identified by their IMGIDs. Input property arrays are IMGID-indexed arrays, where at the entry in position X is loaded the property of the vertex/edge with IMGID X, as illustrated in FIG. 3A. Graph algorithms require the loading of input properties in memory, into arrays indexed by the IMGIDs of vertices or edges.

Figure 3B:
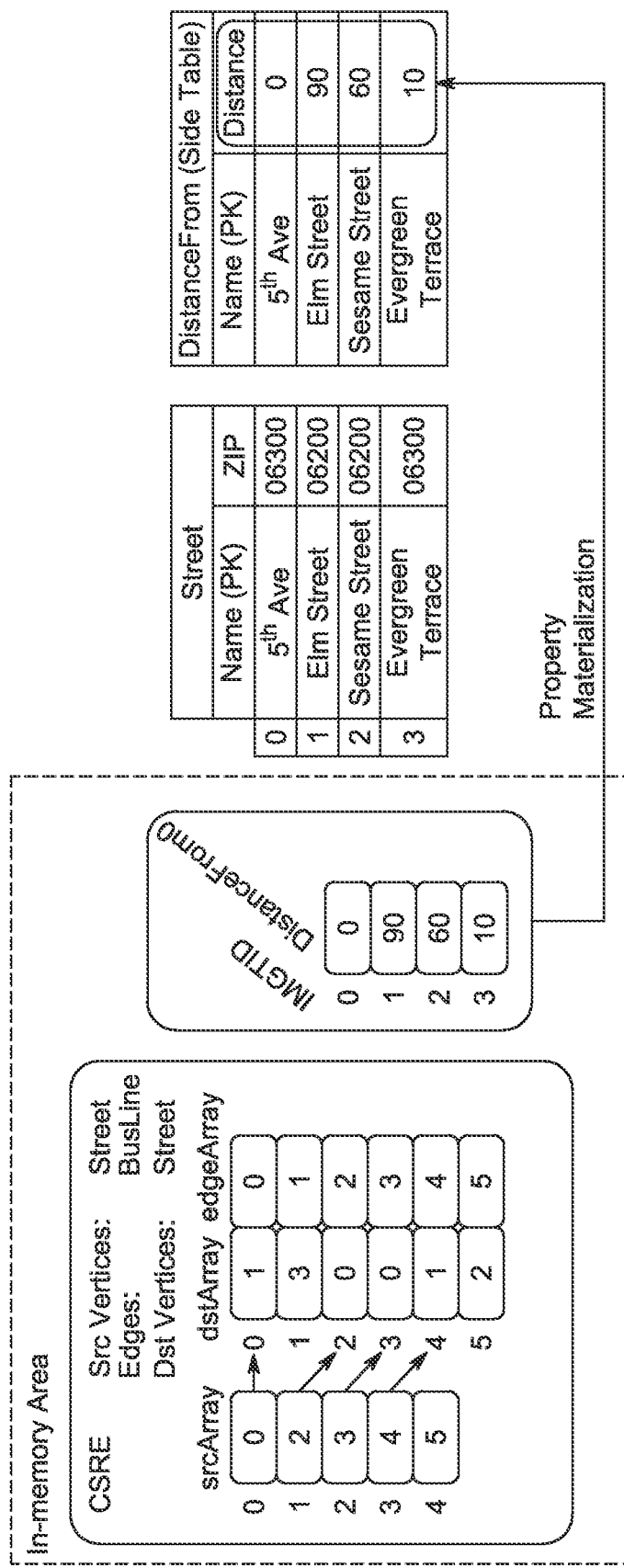

After the execution of a graph algorithm, its results are chained to other SQL statements, that further perform other analytics. Vertex/edge output property arrays are IMGID-indexed; the entry at position X stores the property computed for the vertex/edge with IMGID X. Output properties are materialized into RDBMS side tables (temporary tables), where rows are identified by the vertex/edge PK values, hence IMGID are mapped back to the corresponding PK value, as illustrated in FIG. 3B. Graph algorithms enable property output materialization, mapping output property entries to the respective row with PK matching the IMGID.

Figure 4:
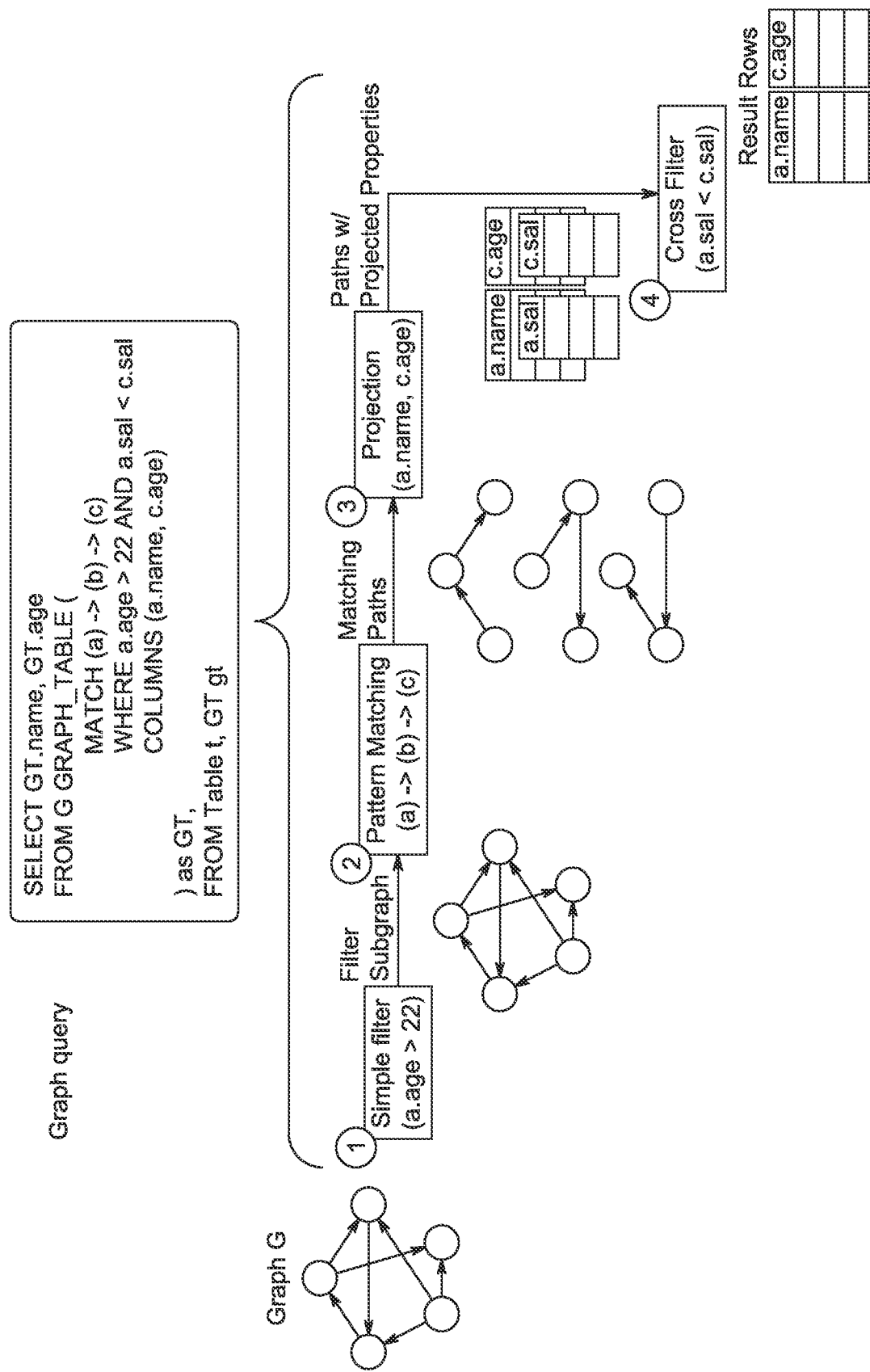
FIG. 4 illustrates an anatomy of a graph query.

IMGIDs in graph queries. Graph Queries search for graph paths, matching a pattern expressed as a sequence of vertices and edges whose properties evaluate positively to certain conditions. The workflow of a graph query, as illustrated in FIG. 4, encompasses four phases or stages: (1) simple filtering, (2) pattern matching, (3) projection, and (4) cross-filter evaluation. Phase (1), simple filtering, filters vertices and edges, returning a subgraph of vertices and edges whose properties respect the filtering predicate. Phase (2), pattern matching, accesses the CSRE and explores the subgraph, searching for paths that match the pattern. The output of this phase is a list of matching paths. Phase (3), projection, retrieves the selected properties for vertices and edges along the discovered paths. Lastly, phase (4), cross-filter evaluation, filters the paths according to predicates defined over properties of multiple elements in a path (e.g., two vertices in a path, etc.).

The core of graph query resides in phase (2). In this phase, the CSRE is accessed to explore the topology. In phase (2), vertices and edges are identified by their IMGIDs, whereas, in phases (1), (3), and (4), the query operates over tables rows. Hence, phase (1) returns a subgraph, represented by vertex/edge rows matching the predicate. The Vertex/Edge-IMGID mapping enables the translation of subgraph elements to IMGIDs, as such identifiers are used during phase (2). Phase (2) computes a list of matching paths, whose vertices and edges are represented by their IMGIDs. The query engine needs to retrieve the values for the properties selected in the graph query, in order to compose the final projected result. The Vertex/Edge-IMGID mapping enables using the IMGIDs of vertices and edges along all the matching paths to access and gather the properties stored in the corresponding vertex/edge rows.

Implementation Considerations

Many RDBMSes that support graph analytics are not transparent towards the creation of graph indexes, leaving the user in charge of adapting the data model to match the requirements. Existing solutions constrain users to provision tables with specific key columns. In some cases, enabling graph indexes requires defining and populating dedicated tables. The current solution enables graph indexes to be built over existing, unmodified RDBMS tables. Users interested in speeding up graph queries and graph algorithms, can easily mark existing tables with a specific DDL statement, transparently triggering the creation of IMGIDs, and enabling the construction of CSREs. In an embodiment, users mark a graph instead. The database transparently determines out what tables need IMGID from a catalog's metadata on graph definition.

The current solution includes the creation of IMGIDs, their maintenance over time, and the mapping between vertex/edge table rows to IMGIDs. IMGIDs are integer identifiers of vertices and edges, used as indexes within the CSRE, and the property arrays. IMGIDs meet the four following considerations:

Consideration (1), IMGIDs are transactionally consistent: As discussed herein, IMGIDs are required to be transactionally consistent. Any transaction sees the mapping vertex/edge-IMGIDs as being consistent with the version at which it operates, hence, the mapping is dynamic and works in face of updates to vertex/edge tables.

Consideration (2), the vertex/edge-IMGID mapping is independent from the data layer: Certain RDBMSes, like Oracle Database, have hybrid on-disk, row-oriented, storage, and in-memory, column-oriented, storage. In order to enable transparent use of both storages, the mapping shall not use any property or feature (e.g., addresses, indexes, etc.) specific to the type of storage.

Consideration (3), IMGIDs are a mostly-dense integer set: As discussed herein, IMGIDs have to be sufficiently dense to serve as array indexes. Every gap in the sequence, such as IMGIDs that do not correspond to any vertex/edge, implies invalid entries in the CSRE source arrays, and property arrays. A factor K, given a table T, defines the cardinality of the integer set as |IMGID|<=K*|T|, bounding the maximum number of invalid entries in the srcArray of the CSRE or the property arrays. This requirement has an impact on the design of the various arrays, as a strategy is needed to discern valid entries from invalid ones.

Consideration (4), constant time vertex/edge-IMGID resolution: Given a vertex/edge row, the corresponding IMGID is looked up in O(1). Furthermore, given a set of IMGIDs, the mapping can be used to retrieve column values for rows identified by such IDs.

The first two considerations relate to functions/features, while the two last considerations relate to performance.

High-Level Design: Dictionary Encoding of Primary Key Values

As used herein, the term "primary key" is a set of one or more columns in a table that is unique and not NULL, such that it is sufficient to always uniquely identify a row in the table. The primary key constraint does not necessarily have to be enforced by the RDBMS by defining these columns as being a PRIMARY KEY in SQL. Instead, a satisfactory set of columns can be defined as acting as a primary key for a table in the graph definition DDL.

Vertex/edge rows, in their tabular representation, are identified by their primary key values. In order to associate integer identifiers (e.g., the IMGIDs) to each vertex/edge row, their PK values are dictionary encoded.

Figure 5:
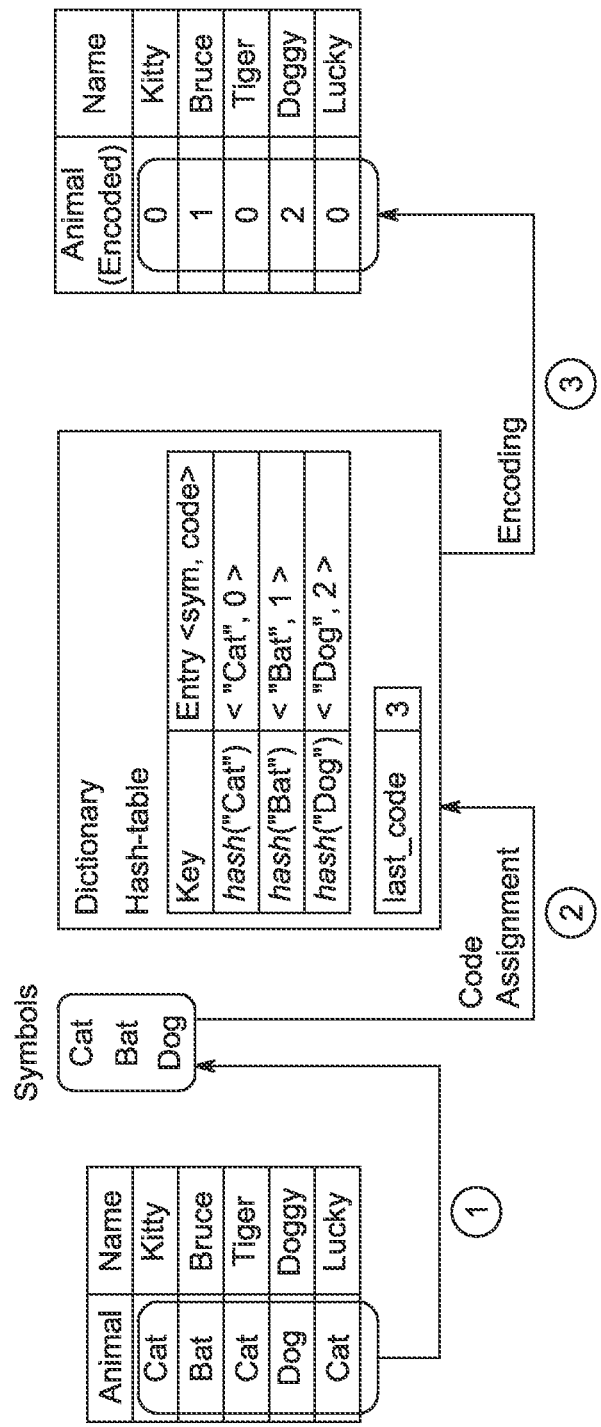
FIG. 5 illustrates an example dictionary encoding over a table column.

Dictionary encoding is a compression technique that replaces symbols with compact integer codes. In dictionary encoding, an in-memory entity (e.g., dictionary) generates a sequence of integer codes and maps symbols to such identifiers. The mapping is recorded by an associative array symbol-code (e.g., hash table). FIG. 5 depicts an example dictionary encoding over a table column.

By looking up the dictionary, symbols get translated to their integer representation and vice-versa. The integer representation can be used as a replacement for the symbol itself, in scenarios when is most convenient (e.g., saving space in case of duplicated values). Dictionary encoding serves as a means to substitute arbitrarily-typed unique values, the PK values that identify vertices/rows, with integers usable as array indexes, the IMGIDs.

The dictionary generates IMGIDs for vertex/edge PK values and records the mapping inside a hash table. The hash table has, as a key, the hash code for the symbols. Entries of the hash table are <symbol, code> tuples. The dictionary encoding is specialized to make the PK-IMGID mapping compliant with the above-described considerations. The encoding follows specific strategies for code generation (how to generate the sequence of integers, namely the IMGIDs), and symbol insertion policy (how the dictionary is updated). Specifically:

Code generation: Codes are generated from a starting value, such as 1, and when a new symbol is encoded, its code is equal to the last generated code plus one. In an embodiment, 0 may be used to represent an invalid value.

Insertion policy: The dictionary is updated by inserting new symbols, which are associated to new codes. However, in case existing symbols disappear from the system (e.g., they are deleted or replaced within a table), their encoding, and hence their mapping to an integer code, is never deleted unless the whole dictionary is dropped.

Such specialized dictionary encoding complies with all the considerations for IMGIDs expressed above:

Never removing symbol-code entries from the dictionary, together with the possibility of encoding new symbols, guarantees transactional consistency (Consideration (1)). Indeed, any transaction will always see the mapping for every symbol, of every one of the committed rows, at their version (mappings never deleted). Furthermore, as new symbols can be added to the dictionary, the transaction sees the mapping for these new values, results of insert/update data manipulation language ("DML") operations within the transaction itself, or other previously-committed transactions.

RDBMS table rows are typically identified by their PK columns and so are identified vertices and edges. This mechanism of identifying vertices and edges is independent from the storage support, whether it is a disk-based row oriented format, or and in-memory column oriented one. Therefore, the strategy of mapping PK values to IMGIDs, via dictionary encoding, achieves Consideration (2).

Dictionary codes are generated as a monotonic sequence starting from 0, increased by one at each new encoding. Gaps in the sequence only occur when symbols disappear from the system, but their encoding is kept in the dictionary (according to the insertion policy discussed before). The number of gaps depends on the deletions/updates over the encoded table, and hence can be monitored and can potentially trigger a re-encoding to densify the codes (the dictionary is dropped and recreated). Such behavior achieves Consideration (3) for PK-IMGID mapping.

The dictionary leverages an in-memory hash table to store the mapping between symbols and codes. Such a data structure enables the constant-time lookup of symbols to codes, hence achieving Consideration (4).

Transactional consistency of IMGIDs is enabled within the lifetime of the PK-IMGID mapping. Never deleting mapping entries guarantees transactional consistency and, at the same time, also produces gaps in the IMGID sequence. PK values can be re-encoded from time to time to generate a new dense IMGID sequence, eliminating the gaps. Such an operation drops the PK-IMGID mapping and, hence, queries will not leverage it anymore. The queries will leverage the newly created one instead. More details on this operation are provided in the IMGID RECOMPACTION section.

In an embodiment, the in-memory hash table mapping between symbols and codes may be stored on disk and reloaded into memory leveraging its fast start capability, saving IMGID reconstruction time when loading. It may be beneficial to utilize the fast start capability of memory in scenarios where PK values are stable (e.g., seldomly updated) once inserted in the hash table. When the hash table is written to disk, reloaded into memory, or both, PK values can be re-encoded to generate a new dense IMGID sequence, eliminating the gaps in the IMGID sequence.

The SYS_Graph_IMGID Virtual Column

The principal interface for retrieving IMGIDs for a given row (PK value) is via a hidden virtual column. This virtual column is referred with the name of SYS_GRAPH_IMGID. It is transparently added to the definition of a vertex/edge table, when a graph defined over it is altered to be in-memory (hence, creating the CSREs to represent the graph). When no in-memory graph uses the table, the column may be dropped. An example of query that uses SYS_GRAPH_IMGID is:

SELECT_SYS_GRAPH_IMGID FROM vertex_table.

In an RDBMS, a virtual column is a column defined as an expression over (some of) the columns of a table. Virtual columns are not materialized on permanent storage but have their value computed at query execution time. Virtual columns may be referenced in database statements like other types of columns. Virtual columns are described in U.S. Pat. No. 10,204,135 B2, issued Feb. 12, 2019, titled "Materializing Expressions Within In-Memory Virtual Column Units To Accelerate Analytic Queries," and in U.S. application Ser. No. 16/904,392, filed Jun. 17, 2020, titled "Techniques for In-Memory Spatial Object Filtering," wherein the entire contents of which are hereby incorporated by reference as if fully set forth herein.

The expression that defines SYS_GRAPH_IMGID is the invocation of the special SQL operator SYS_GET_GD-CODE ($col_1, col_2, \ldots, col_m$). This operator serves as the interface for dictionary lookup, and symbol insertion. Specifically SYS_GET_GDCODE ( ) takes as its input a list of column values and performs the following:

1. Assuming that all DBMS datatypes that can be used to define primary/foreign key columns are byte-serializable, the operator concatenates the input for each row, to obtain a single, unambiguous value, used as a symbol for the dictionary encoding. This concatenation is obtained by prepending to the serialization of each input values with its length in bytes. Given m columns, the concatenation is:
<col1's length bytes><col1's value bytes> . . . <colm's length bytes><colm's value bytes>
This step adds support for multi-column primary keys. Multi-columns are collapsed into a single, unique representation of the compound values.
2. Look up the dictionary to retrieve the code associated with the symbol built at step 1. If the symbol was not found, the dictionary generates a new code from the sequence and associates it to the symbol (the entry <symbol, code> is inserted into the hash table using as key hash (symbol)).
3. Return the code that was either found as the result of the lookup or newly created.

Figure 6:
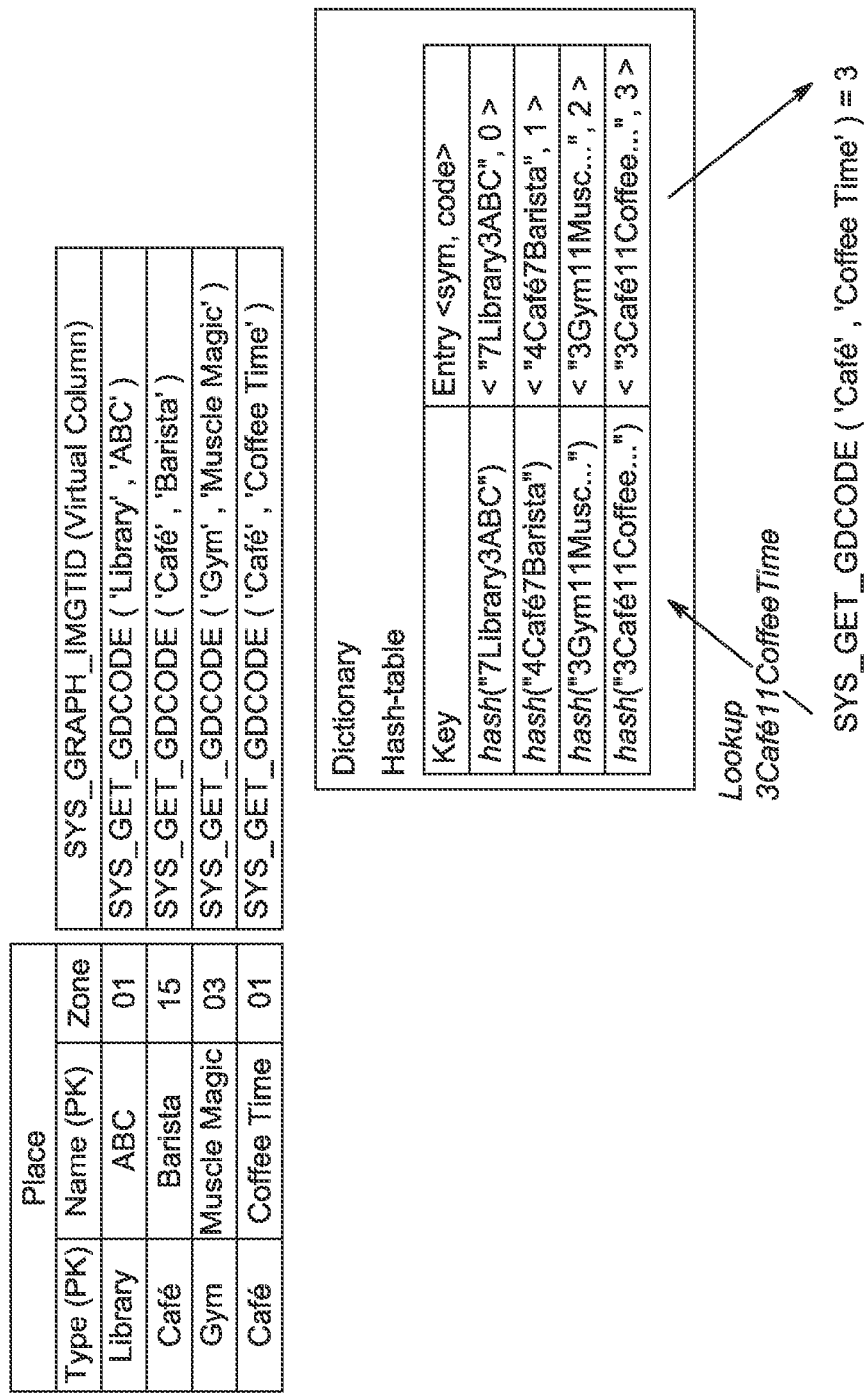
FIG. 6 illustrates an example table with a virtual column.

FIG. 6 shows an example table with the SYS_GRAPH_IMGID virtual column. The vertex table Place is defined with PK columns Type and Name. Therefore, in order to create the mapping of the row to the IMGID, the virtual column SYS_GRAPH_IMGID is added to the table. What follows is the translation in SQL of the operation to add such a column in an RDBMS:

ALTER TABLE Place ADD (SYS_GRAPH_IMGID INVISIBLE AS SYS_GET_GDCODE(Type, Name))

Certain RDBMSes, such as Oracle Database, support the materialization, in-memory, of a virtual column, to speed-up query execution. By enabling this feature, SYS_GRAPH_IMGID caches the resolution of the PK-IMGID mapping: the IMGID for the combination of PK values of the row is retrieved and stored in the same row, promptly ready to be projected or used to index the various CSREs/property arrays and bitsets.

Dictionary

The PK-IMGID mapping maps vertices or edges from their tabular representation to IMGIDs. The mapping encompasses one, and only one, dictionary. The dictionary generates integer codes and associates them to encoded symbols. The dictionary is based on a hash table to store the mapping, and an integer counter that records the last generated code. The hash table is indexed by the hash of the symbols (seen as a variable-size byte sequence) and stores <hash (symbol), code>key-value pairs.

In an embodiment, a first DDL statement defines a heterogeneous graph and a second DDL statement materializes it in-memory, triggering the creation of the CSRE representation. The second DDL operation performs the following before triggering CSRE creation: for each vertex and edge table used by the graph that does not already comprise the SYS_GRAPH_IMGID virtual column, the virtual column is defined for the table (identifying the primary key columns from the graph metadata in the database dictionary), and an empty dictionary is created and associated with the table. The first task executed includes creating an empty PK-IMGID mapping for every vertex/edge table involved in the graph definition, if the mapping was not already created by another graph that uses the vertex/edge table). From this point, the PK values can be encoded, and the dictionary can be looked up to retrieve the IMGID associated to a symbol. Use of DDL statements to define graphs are described in U.S. application Ser. No. 17/080,700, filed Oct. 26, 2020, titled "Efficient Compilation of Graph Queries Including Complex Expressions on top of SQL Based Relational Engine," wherein the entire contents of which are hereby incorporated by reference as if fully set forth herein.

Symbol Insertion

The dictionary offers the following API:
get_code (symbol): Look up the hash table for the code associated to the symbol. If the symbol was not found, a new code is generated and the entry <symbol, code> is added to the hash table with key hash (symbol). The function returns either the code that was found or the newly-generated code.

This API is used by the SQL operator SYS_GET_GDCODE ( ) to interface with the dictionary. The dictionary gets populated through the evaluation of SYS_GET_GDCODE ( ), which adds the symbols through calls to get_code( ).

Prior the construction of a CSRE, for each of the three underlying RDBMS tables—the source vertex table, the destination vertex table, and the edge table—all the PK values of every existing row are encoded in the dictionary that is associated to the table (initial population). Afterwards, when new rows get inserted, or PK values are updated, symbols are lazily encoded. The IMGIDs for new symbols are generated on-the-fly when SYS_GET_GDCODE( ) is invoked for such rows (deferred insertion).

Readers of the dictionary must acquire a read lock to prevent concurrent processes from altering the underlying hash table during the lookup. Multiple read locks can be acquired at the same time by concurrent readers. Updating the dictionary (e.g., generating new codes, and inserting the mappings into the hash table) requires the acquisition of a write lock. Acquiring a write lock involves waiting for all read locks to be released. The dictionary supports two insertion modes, in order to limit the number of write-lock acquisitions:

Bulk insertion: When the virtual column SYS_GRAPH_IMGID is materialized in-memory, all symbols are inserted as a single batch.
Normal insertion: The evaluation of SYS_GET_GDCODE( ) prepares the symbols for the input rows, acquires the lock, and performs the insertion into the dictionary.

Bulk insertion is suitable for the initial population, when a large number of symbols needs to be encoded. In bulk insertion mode, the SQL operator SYS_GET_GDCODE ( ) goes through an alternate evaluation path, where it transparently buffers the symbols in memory, without inserting them into the dictionary. After the batch size reaches a threshold (e.g., 500K symbols), the write lock is acquired, and all the symbols are encoded and added to the hash table.

Normal insertion is suitable for symbols that are encoded after the initial population. Symbols are inserted into the dictionary when their values are first needed by a query (e.g., during a table scan), not during a DML statement. Further, in an embodiment, changes are not rolled back to the dictionary. This can happen for example if a transaction inserts a row, queries it, then aborts. In this case, it will still leave the mapping between the symbol and the IMGID behind.

When a database supports caching a virtual column in-memory, as is the case for the Oracle Database, then values from the SYS_GRAPH_IMGID virtual column can be retrieved without (read) locking the dictionary most of the time. This is key for operations that heavily use SYS_GRAPH_IMGID for projection and/or predicate evaluation.

Dictionary Lifetime

A PK-IMGID mapping and its dictionary are kept in-memory if there is at least one existing CSRE leveraging it. Several CSREs can leverage the same PK-IMGID mapping when they are built over a common vertex/edge table. Reference counters are used to decide when a PK-IMGID mapping must be freed.

In-memory graph creation. When a graph is ALTERed to be in memory, it needs the PK-IMGID mappings for all vertex and edge tables in the graph. Some of these mappings may already exist; others are created with a reference count of 1. At this point, no CSRE uses these newly-created mappings, but the reference count must be greater than zero to ensure the mapping will not be freed. Following this, CSREs are created one after the other, and each time a CSRE is created, the reference counts for the mappings it uses are incremented by 1. At the end of the graph creation operation, the reference counts of the PK-IMGID mappings that were created by the operation are decremented by 1.

In-memory graph deletion. When an in-memory graph is ALTERed to not be in memory anymore, its CSREs are freed one after the other. Each time a CSRE is freed, the reference count for the PK-IMGID mappings it uses is decremented by 1.

If a reference count is equal 0, the corresponding PK-IMGID mapping can be freed either when decrementing the counter makes it reach 0 or later on if a garbage collector is used.

IMGID Recompaction

Over time, DMLs may delete or update (e.g., modify PK values of) rows in the tables, causing the use of some symbol to cease. As encoding entries are never deleted from the dictionary, this results in gaps over the IMGID sequence. In such cases, arrays indexed by IMGIDs have invalid entries in the position corresponding to extinct symbols. As part of Consideration (3) for IMGIDs, the concept of density factor K is used to guard against the escalation of invalid entries due to excessive deletes/updates. When the inequality |IMGID|<=K*|T| is not valid, IMGIDs get recompacted (IMGID recompaction). The objective is to re-encode existing symbols, assigning new dense codes, hence eliminating gaps. Since recompaction of a PK-IMGID mapping involves rebuilding the CSREs that use the mapping, PK-IMGID mappings that are close to the |IMGID|<=K*|T| threshold for CSREs that need to be rebuilt may also be recompacted at the same time.

There are several variants for the recompaction operation. Variant (A) has the poorest availability (e.g., longest interruption of service) for graph algorithms/queries, whereas Variant (B) provides the best availability at the expense of consuming twice the memory used by the dictionary and the CSREs during the recompaction process. Variant (C) is a combination of Variant (A) and Variant (B).

Variant (A). In this variant, the dictionaries of the PK-IMGID mappings that need to be recompacted are dropped and all the symbols in the corresponding tables are re-encoded, obtaining new, dense, IMGIDs. Before dropping the dictionaries, the system waits for the ongoing operations (algorithms and queries) that use them to complete. CSREs leveraging the mappings have to be dropped, and they are re-built once the new dictionaries are created.

This recompaction strategy negatively affects the availability of graph algorithms/queries, which cannot execute with in-memory acceleration until the symbols have been re-encoded, and all the CSREs leveraging the mappings are rebuilt. However, the recompaction task is not expected to fire often in an OLTP system. Indeed, the rate of deletions/updates is expected to be low as compared to insertions. Updates (e.g., PK, PK-FK updates) can be quite high in an OLTP scenario, but the IMGID dictionary are oblivious to these updates as they do not modify the dictionary.

Variant (B). This variant aims at increasing the availability of graph query/algorithms, trading it for a higher peak memory consumption. In this variant, for each PK-IMGID mapping that needs to be recompacted, a second mapping is created alongside the existing one. The second mapping enables running graph queries/algorithms against the original mapping (and the original CSREs), while a new dictionary is populated (inserting PK values for the mapped vertex/edge table), and the CSREs are rebuilt.

This solution offers a seamless transition to the new mappings. The dictionary and the CSREs are built in the background as graph queries/algorithms execute against existing structures. However, the memory consumption for the in-memory graph representation peaks while the two mapping coexist. For a given set of mappings being recompacted, during the recompaction operation, there are:

Two dictionaries for each mapping, which encode all symbols of a vertex or edge table.

Two sets of CSREs, leveraging the mappings and their replacements.

In an embodiment, at most two active mappings can be created for a given table (e.g., only a single recompaction operation can be executed at a time for a given mapping).

Variant (C). This variant combines Variants (A) and (B), based on the available memory in the system. When a recompaction operation is executed, an estimation of the memory required is performed to make a preliminary decision regarding which variant to adopt. Let us define the memory usage M for a set of mappings as the sum of the memory footprint of the dictionaries of each mapping and the memory footprint of all CSREs from every graph that leverage at least one of the mappings in the set. If M is greater than the available system memory (e.g., there is enough memory to replicate the mappings in-memory), then the compaction follows the steps described in Variant (B). Otherwise, the procedure falls back to Variant (A).

IMGIDS as Array Indexes

IMGIDs are a mostly dense set of integers. As IMGID-indexed arrays are allocated of size n=|IMGID|, gaps in the sequence imply the presence of invalid array entries. These arrays are always paired with a validity bitset, which enables iterators for graph queries or algorithms to check for invalid entries.

Figure 7:
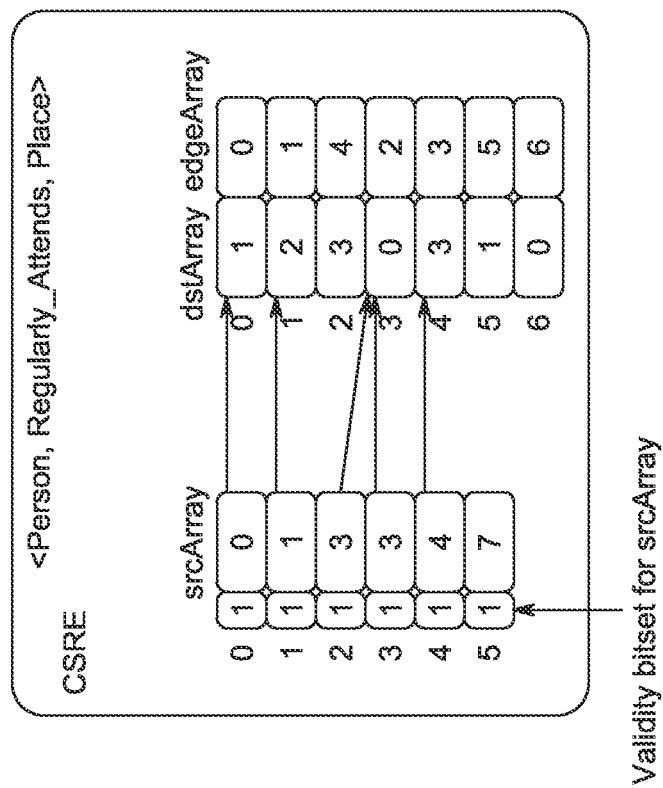
FIG. 7 illustrates an example CSRE array indexed by IMGIDs.

FIG. 7 depicts the CSRE srcArray, indexed by IMGIDs and its validity bitset. This bitset has one bit for each array entry. A set bit at position X indicates that the array entry at position X is valid. The CSRE arrays are paired to bitsets to identify invalid entries due to gaps in the IMGID integer space.

IMGID Projection

The following discussion shows how IMGIDs are projected, leveraging the interface described herein.

CSRE construction using SYS_GRAPH_IMGID. The first scenario is retrieving IMGIDs for CSRE construction. CSRE construction requires collecting the IMGIDs of the source and destination vertices for every edge in the subgraph described by the CSRE. This information is a tuple of the form:

<src_vertex_IMGID, edge_IMGID, dst_vertex_IMGID>

Such tuples are retrieved by performing two SQL JOINs between (1) the source vertex table and the edge table, and (2) the destination vertex table and the edge table, along the two PK-FK relationships that define the source_vertex-edge-destination_vertex connection. The query performing the JOINs uses the SYS_GRAPH_IMGID virtual column. Table 1 shows an example of such query.

TABLE 1

-- SRC is the source vertex table
-- EDGE is the edge table
-- DST is the destination vertex table
-- The columns that link SRC-EDGE and DST-EDGE are,
-- respectively, SRC.pk_i/EDGE.src_fk_i and
-- DST.pk_i/EDGE.dst_fk_i
SELECT SRC.SYS_GRAPH_IMGID,
    EDGE.SYS_GRAPH_IMGID,
    DST.SYS_GRAPH_IMGID
FROM SRC, EDGE, DST
WHERE SRC.pk1 = EDGE.src_fk_1 AND ... AND SRC.pk_n =
EDGE.src_fk_n
AND DST.pk_1 = EDGE.dst_fk_1 AND ... AND DST.pk_m =
EDGE.dst_fk_m Property loading using SYS_GRAPH_IMGID. In the context of graph algorithms, properties need to be loaded in memory, and stored into IMGID-indexed arrays that are directly accessible by the iterators that navigate through the CSRE. The same IMGIDs used to index the CSRE arrays are used to access properties of a given vertex or edge. In order to load properties in memory, the information to retrieve is <IMGID, property_value> tuples. This information is retrieved through an SQL query, with a SELECT statement that projects the property values (a column of a vertex or edge table) and the IMGID (via SYS_GRAPH_IMGID). Table 2 shows an example of such query.

TABLE 2

-- In the example shown from FIG. 1, load the Rate property
-- from table EDGE
SELECT EDGE.SYS_GRAPH_IMGID,
    EDGE.Rate
FROM Regularly_attends AS EDGE IMGID Filters for Graph Queries Previous sections introduced graph queries and their workflow and identified two points in time when identifiers for vertices and edges are translated from PK values to IMGIDs and vice-versa. This happens at the boundaries of the pattern matching phase, where the query engine accesses the CSRE to explore the topology. Translating PK values to IMGIDs means:

Transforming the output from the simple filtering phase (phase 1 in FIG. 8) from a set of filtered vertices/edges rows (identified by PKs) to a set of integers identifiers (IMGIDs).

Transforming the output from the pattern matching phase (phase 2 in FIG. 8) from a set of IMGIDs to a set of PK values, used to retrieve the property of such rows.

Since IMGIDs are dense, sets of IMGIDs are represented as bitsets. In an embodiment, the format chosen to represent a set of IMGIDs, given the density of such identifiers, is the bitset.

Figure 8:
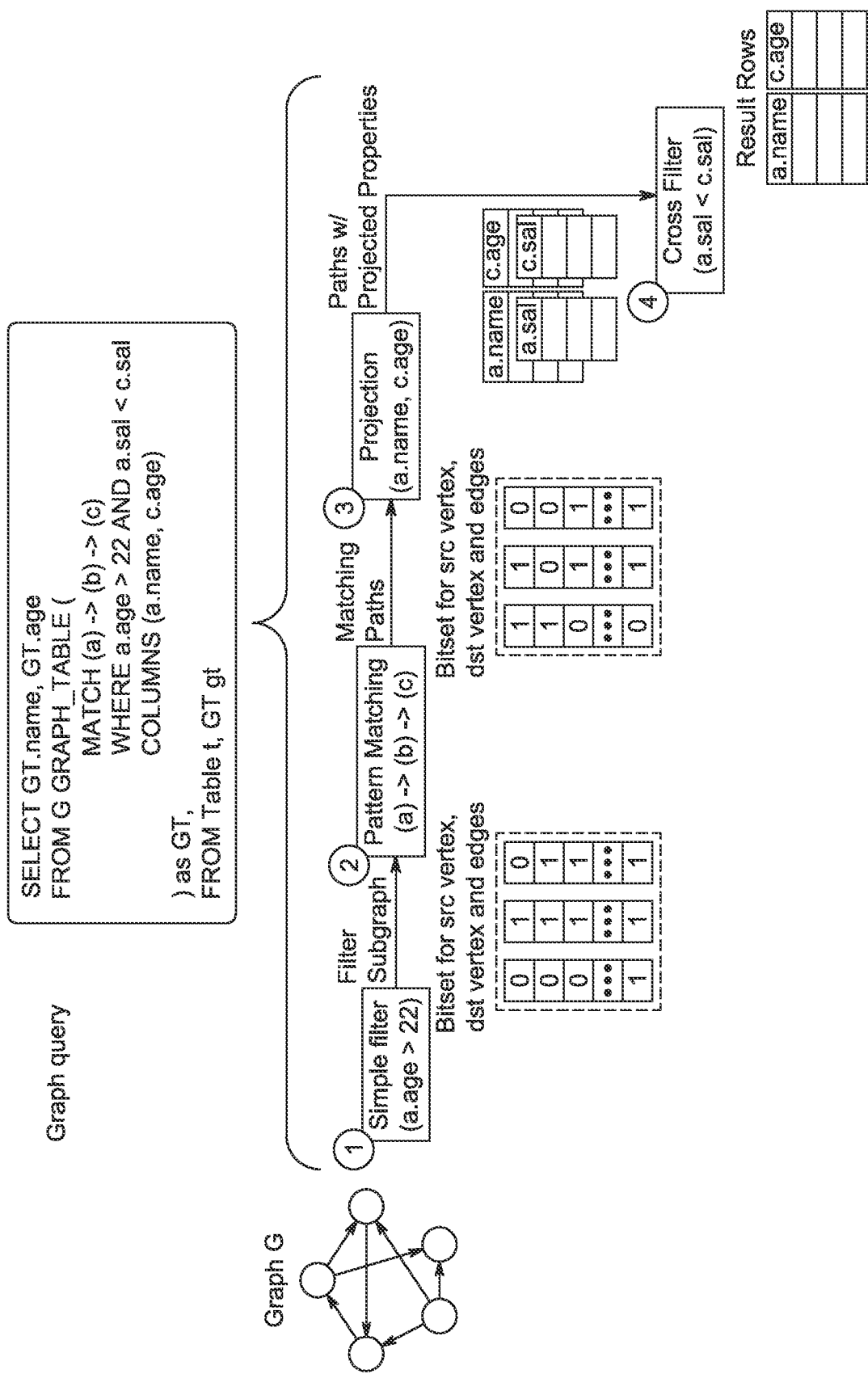
FIG. 8 illustrates another anatomy of a graph query.

The output from the simple filtering phase is a collection of IMGID-indexed bitsets, representing vertices/edges that pass the filter (FIG. 8). One bitset is allocated for each vertex/edge table involved in the query. The bitset is initialized during the table scan operation (iteration over the table rows) that evaluates the predicate over the rows. For each row that passes the filter, the IMGID retrieved by accessing the SYS_GRAPH_IMGID virtual column is used to index, and set, the corresponding bit of the bitset. In the following phase, the iterators that navigate the CSRE structure use the same IMGIDs that index the CSRE arrays to access the bitsets and check whether a vertex/edge has to be considered in the exploration.

Similarly, matching paths returned by phase 2 are also represented by bitsets (FIG. 8). The set bits represent vertices/edges along the path whose selected properties (column values) need to be retrieved in order for the query engine to put together the final result (projected paths). Retrieving properties is implemented through a table scan, with a special predicate to determine whether columns should be projected or not for a given row. This special predicate is a membership test that answers the question: Does the vertex/edge row belong to a path returned by phase 2? In plain SQL, such a predicate would be encoded as:

SELECT a.age FROM t where IMGID IN (i1, i2, ... )

The membership is not encoded by plain SQL but efficiently run against the bitsets. Given a row, the value of the SYS_GRAPH_IMGID column (e.g., the IMGID) is used to index the bitset and test the bit to check whether to project the row or not.

Leveraging bitsets to represent filtered sets of vertices/edges, or set of vertex/edge properties to project, efficiently serves as an interface between the tabular world and the CSRE world. The dense integer nature of IMGIDs is exploited to allocate and index bitsets, providing a space-efficient implementation of a set of elements with fast access.

Bitset Access Concurrency. Assume in-memory tables are segmented in chunks of rows, and table scan spawns a parallel task per chunk. In the context of this invention, the table scans described to filter vertices/edges during phase 1 of a graph query can involve concurrent writes into the bitsets. Atomic instructions are leveraged to implement concurrency control: the bitsets are arrays of bytes that can be updated through Fetch-and-Or instructions (or Compare-and-Swap instructions if Fetch-and-Or instructions are not provided by internal APIs of the RDBMS). Contention is only experienced by rows that are (i) mapped by the same bitset atomic variable, and (ii) stored in different chunks. Since the atomic instructions operate over words of one byte only, contention is likely to be low.

Process Flow Example

Figure 9:
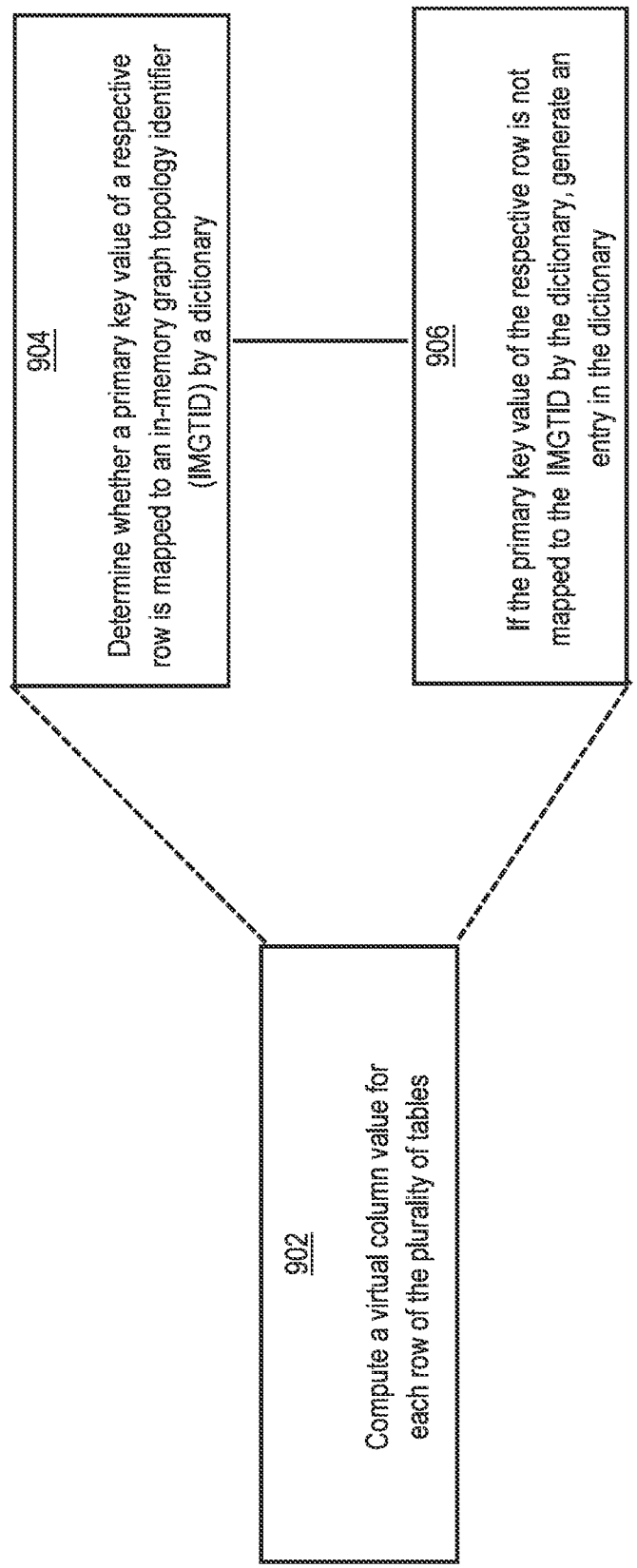
FIG. 9 illustrates an example flow diagram that depicts a process for generating an in-memory graph representation.

FIG. 9 illustrates an example flow diagram that depicts a process 900 for generating an in-memory representation for a graph defined by a database management system (DBMS). The DBMS stores vertices and edges of the graph in a plurality of tables that includes at least two vertex tables and at least one edge table. Each table of the plurality of tables includes a primary key comprising one or more columns of a respective table.

At step 902, for each row of the plurality of tables, a virtual column value is computed for a respective row.

In an embodiment, the virtual column value is computed for the respective row by determining, at step 904, whether a primary key value of the respective row is mapped to an in-memory graph identifier (IMGID) by a dictionary. The primary key value may be a compound value. For example, if the primary key comprises multiple primary key columns, the primary key value is a concatenation of all values associated with the primary key columns and their corresponding lengths, as described above.

If the primary key value of the respective row is mapped to the IMGID by the dictionary, then the IMGID is returned as a result of the dictionary lookup. However, if the primary key value of the respective row is not mapped to the IMGID by the dictionary, then an entry is generated in the dictionary, at step 906. The generated entry describes a mapping of the primary key value to the IMGID. The mapping may be cached in memory to speed up query execution.

In an embodiment, the primary key value is encoded to generate the IMGID. In an embodiment, IMGIDs are generated from a starting value, such as 1. For example, when a new primary key value is encoded, its corresponding IMGID is equal to the last generated IMGID plus one. An integer counter may be used to record the last generated IMGID such that the IMGIDs are generated as a monotonic sequence starting from 1, increased by one at each new encoding.

The dictionary is updated with the IMGID. In an embodiment, the IMGID is recorded inside an in-memory data structure that enables O(1) or constant-time lookup of primary key values to IMGIDs. For example, the in-memory data structure may be a hash table. The dictionary leverages the in-memory hash table to store the mapping between the primary key value and the IMGID. In an embodiment, the IMGID and other IMGIDs are stored, at the same time, in the in-memory hash table, during a storage access (e.g., a table scan).

In an embodiment, the in-memory representation is a CSRE that is built from the plurality of tables and is associated with the graph defined by RDBMS. Building the CSRE includes populating a srcArray, a dstArray and an edgeArray. The srcArray, the dstArray and the edgeArray contain vertices and edges, which are each identified by a respective IMGID.

When the plurality of tables is updated (e.g., rows updated or deleted), the primary key values corresponding to the rows that were updated or deleted no longer exist. As such, the arrays indexed by IMGIDs have invalid entries in the position corresponding to the nonexistent primary key values. In an embodiment, when the number of invalid entries in the arrays exceed a threshold, the existing primary key values are re-encoded by performing an IMGID recompaction operation. The in-memory representation for the graph is rebuilt in response to the IMGID recompaction operation being performed.

A graph query includes a path pattern expression. The graph query searches for graph paths that match the path pattern expression. The path pattern expression may be evaluated against the in-memory representation for the graph. Each path matching the path pattern expression includes vertices and edges that are represented by their respective IMGIDs. In an embodiment, IMGIDs are used to index a plurality of bitsets used during the graph query. The plurality of bitsets include a first bitset for identifying filtered graph elements and a second bitset for identifying graph elements from which to project values.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

An SQL statement includes one or more query blocks. A query block is the basic unit of a SQL statement that specifies a projection operation (e.g. columns specified in a SELECT clause) on a row source (i.e. table, inline view, view referenced by a FROM clause), and may specify additional operations on the row source such as joining and grouping. A query block may be nested within another "outer" query block. A nested query block may be a sub-query or inline view. A query block may be an argument to the UNION clause along with another query block, as illustrated by SQL statements described earlier.

A graph pattern query is a query that specifies a pattern of connected vertices and edges to match within a graph. A graph pattern query may be a statement that conforms to a graph query language. Examples of a graph query language include PGQL, GQL, and Gremlin. PGQL is described in PGQL 1.3 Specification, 24 Mar. 2020, the contents of which are incorporated herein by reference. Gremlin is described in Apache TinkerPop, 3.4.8, TinkerPop Documentation. GQL is being developed by ISO/IEC JTC 1/SC 32 WG3.

A database is defined by a database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access or execute the database objects that are defined by the dictionary. Such database objects may be referred to herein as first class citizens of the database.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., .java file) and the compiled version of the class (i.e., .class file).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing a plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
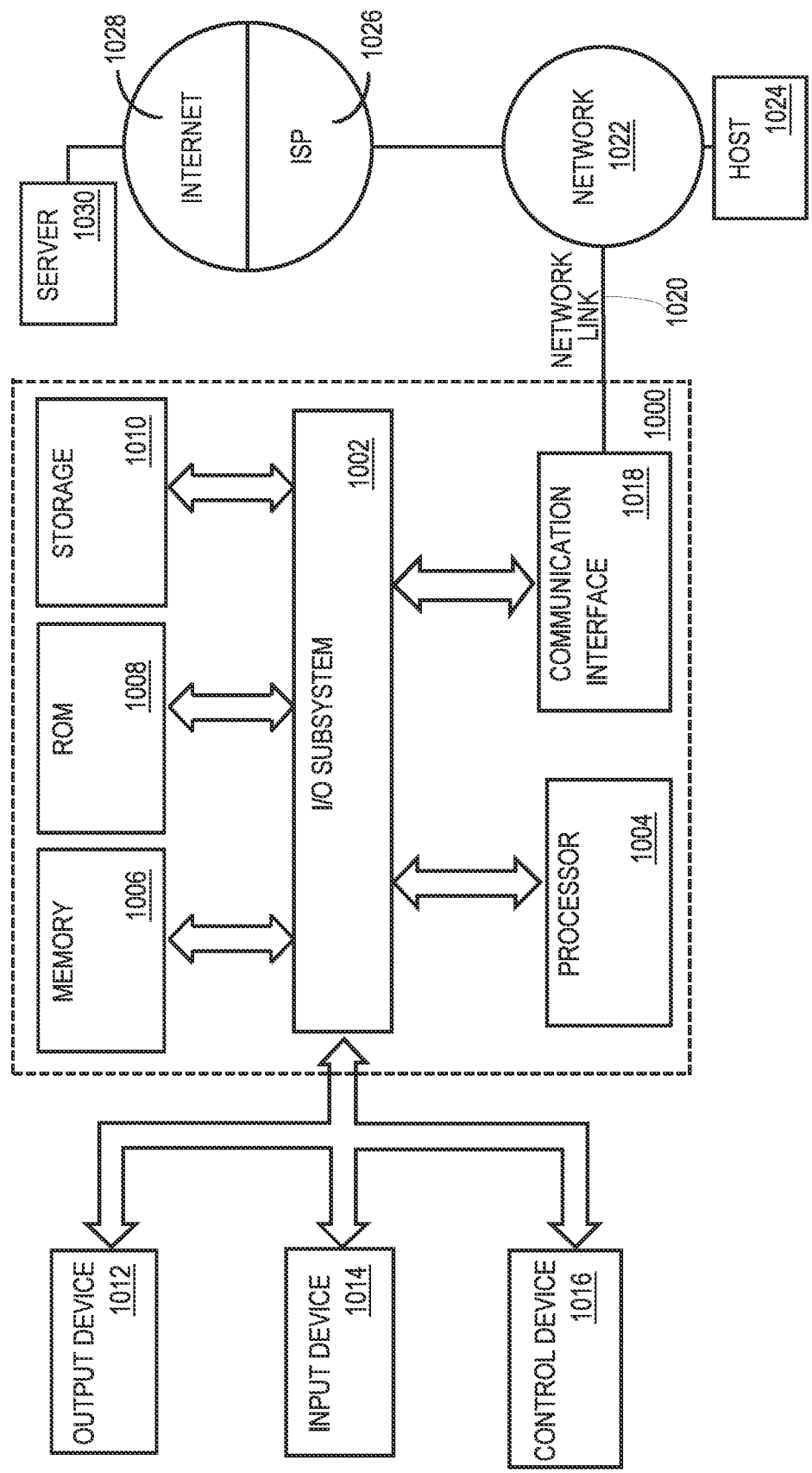
FIG. 10 illustrates a block diagram of a computing device in which the example embodiment(s) of the present invention may be embodiment.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk, or optical disk such as CD-ROM or DVD-ROM and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators, or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to a format that can be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork, or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic, or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine, or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Software Overview

FIG. 11 is a block diagram of a basic software system 1100 that may be employed for controlling the operation of computing device 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing device 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on device 1100 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of device 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the device 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of device 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms, and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
in response to receiving one or more DDL statements (Data Definition language), a database management system (DBMS) defining a graph according to said one or more DDL statements, said one or more DDL statements specifying a plurality of tables for storing vertices and edges of the graph, wherein said plurality of tables includes at least two vertex tables and at least one edge table, wherein said one or more DDL statements specify, for each table of said plurality of tables, a primary key for said graph comprising one or more columns of said each table;
generating an in-memory representation for said graph;
wherein generating the in-memory representation for the graph includes:
for each row of the plurality of tables, computing a virtual column value for a respective row, wherein computing a virtual value comprises:
determining whether a primary key value of the respective row is mapped to an in-memory graph identifier (IMGID) by a dictionary;
if the primary key value of the respective row is not mapped to the IMGID by the dictionary, generating an entry in the dictionary that describes a mapping of the primary key value to the IMGID;
wherein, in the in-memory representation, the vertices and the edges are each identified by a respective IMGID.

2. The method of claim 1, wherein the primary key value is a compound value.

3. The method of claim 1, wherein generating the entry in the dictionary the mapping of the primary key value to the IMGID comprises:
encoding the primary key value to generate the IMGID;
updating the dictionary with the IMGID.

4. The method of claim 3, wherein the encoding is based on a monotonic sequence starting from a starting value.

5. The method of claim 3, wherein updating the dictionary includes storing the IMGID in an in-memory data structure that enables O(1) lookup of primary key values to IMGIDs.

6. The method of claim 5, wherein the IMGID and other IMGIDs are stored, at the same time, in the in-memory data structure, during a storage access.

7. The method of claim 5, wherein the in-memory data structure is stored on disk, wherein primary key values are re-encoded when the in-memory data structure written to disk or reloaded into memory.

8. The method of claim 1, wherein generating the in-memory representation for the graph further includes extending a definition of each of the plurality of tables with a virtual column, wherein the dictionary is specific to a virtual column of a particular table of the plurality of tables that includes the respective row.

9. The method of claim 1, wherein generating the in-memory representation of the graph further includes caching the mapping in memory.

10. The method of claim 1, further comprising performing a recompaction operation to obtain new mappings and, in response to performing the recompaction operation, rebuilding the in-memory representation for the graph.

11. The method of claim 1, wherein IMGIDs are used to index a plurality of bitsets including a first bitset for identifying filtered graph elements and a second bitset for identifying graph elements from which to project values.

12. One or more non-transitory storage media storing sequences of instructions which, when executed by one or more processors, cause:
in response to receiving one or more DDL statements (Data Definition language), a database management system (DBMS) defining a graph according to said one or more DDL statements said one or more DDL statements specifying a plurality of tables for storing vertices and edges of the graph, wherein said plurality of tables includes at least two vertex tables and at least one edge table, wherein said one or more DDL statements specify, for each table of said plurality of tables, a primary key for said graph comprising one or more columns of said each table;

generating an in-memory representation for said graph;

wherein generating the in-memory representation for the graph includes:

for each row of the plurality of tables, computing a virtual column value for a respective row, wherein computing a virtual value comprises:

determining whether a primary key value of the respective row is mapped to an in-memory graph identifier (IMGID) by a dictionary;

if the primary key value of the respective row is not mapped to the IMGID by the dictionary, generating an entry in the dictionary that describes a mapping of the primary key value to the IMGID;

wherein, in the in-memory representation, the vertices and the edges are each identified by a respective IMGID.

13. The one or more non-transitory storage media of claim 12, wherein the primary key value is a compound value.

14. The one or more non-transitory storage media of claim 12, wherein generating the entry in the dictionary the mapping of the primary key value to the IMGID comprises:

encoding the primary key value to generate the IMGID;

updating the dictionary with the IMGID.

15. The one or more non-transitory storage media of claim 14, wherein the encoding is based on a monotonic sequence starting from a starting value.

16. The one or more non-transitory storage media of claim 14, wherein updating the dictionary includes storing the IMGID in an in-memory data structure that enables O(1) lookup of primary key values to IMGIDs.

17. The one or more non-transitory storage media of claim 16, wherein the IMGID and other IMGIDs are stored, at the same time, in the in-memory data structure, during a storage access.

18. The one or more non-transitory storage media of claim 16, wherein the in-memory data structure is stored on disk, wherein primary key values are re-encoded when the in-memory data structure is written to disk or reloaded into memory.

19. The one or more non-transitory storage media of claim 12, wherein generating the in-memory representation of the graph further includes extending a definition of each of the plurality of tables with a virtual column, wherein the dictionary is specific to a particular table of the plurality of tables that includes the respective row.

20. The one or more non-transitory storage media of claim 12, wherein generating the in-memory representation of the graph further includes caching the mapping in memory.

21. The one or more non-transitory storage media of claim 12, wherein the sequences of instructions which, when executed by the one or more processors, further cause performing a recompaction operation to obtain new mappings and, in response to performing the recompaction operation, rebuilding the in-memory representation for the graph.

22. The one or more non-transitory storage media of claim 12, wherein IMGIDs are used to index a plurality of bitsets including a first bitset for identifying filtered graph elements and a second bitset for identifying graph elements from which to project values.

* * * * *

UNITED STATES PATENT AND TRADEMARK OFFICE
CERTIFICATE OF CORRECTION

PATENT NO. : 11,500,868 B2
APPLICATION NO. : 17/162527
DATED : November 15, 2022
INVENTOR(S) : Segalini et al.

It is certified that error appears in the above-identified patent and that said Letters Patent is hereby corrected as shown below:

On the Title Page

On page 2, Column 2, under Other Publications, Line 28, delete "Chaper" and insert -- Chapter --, therefor.

On page 2, Column 2, under Other Publications, Line 32, delete "Divison," and insert -- Division, --, therefor.

On page 2, Column 2, under Other Publications, Line 48, delete "SAP.dom," and insert -- SAP.com, --, therefor.

On page 2, Column 2, under Other Publications, Line 54, delete "Sever" and insert -- Server --, therefor.

On page 2, Column 2, under Other Publications, Line 72, delete "Pseudocolum"," and insert -- Pseudocolumn", --, therefor.

On page 3, Column 1, under Other Publications, Line 1, delete ""Pseudoclumns"," and insert -- "Pseudocolumns", --, therefor.

On page 3, Column 2, under Other Publications, Line 17, delete "Pipelines" and insert -- Pipelined --, therefor.

In the Specification

In Column 8, Line 7, delete "or and" and insert -- and/or --, therefor.

In Column 8, Line 58, delete "SELECT_SYS" and insert -- SELECT SYS --, therefor.

In Column 10, Line 7, delete "table)." and insert -- table. --, therefor.

Signed and Sealed this
Sixth Day of June, 2023

*Katherine Kelly Vidal*

Katherine Kelly Vidal
*Director of the United States Patent and Trademark Office*

In Column 10, Line 30, delete "code( )." and insert -- code ( ). --, therefor.

In Column 18, Line 30, delete "and or" and insert -- and/or --, therefor.

In the Claims

In Column 26, Line 62, in Claim 12, delete "statements" and insert -- statements, --, therefor.